US012059863B2

(12) United States Patent
Han et al.

(10) Patent No.: US 12,059,863 B2
(45) **Date of Patent: *Aug. 13, 2024**

(54) METHODS OF USING A MACHINE FOR MANUFACTURING CONTINUOUS TOILET SEAT COVER REELS

(71) Applicants: Biao Han, Shenyang (CN); Weilie Liu, Newport Beach, CA (US)

(72) Inventors: Biao Han, Shenyang (CN); Weilie Liu, Newport Beach, CA (US)

( * ) Notice: Subject to any disclaimer, the term of this patent is extended or adjusted under 35 U.S.C. 154(b) by 537 days.

This patent is subject to a terminal disclaimer.

(21) Appl. No.: 17/202,276

(22) Filed: Mar. 15, 2021

(65) Prior Publication Data

US 2021/0197515 A1 Jul. 1, 2021

Related U.S. Application Data

(62) Division of application No. 16/394,039, filed on Apr. 25, 2019, now abandoned.

(30) Foreign Application Priority Data

Apr. 19, 2019 (CN) ......................... 201910318509.3

(51) Int. Cl.
*B31D 1/00* (2017.01)
*A47K 13/22* (2006.01)

(52) U.S. Cl.
CPC ............ *B31D 1/0037* (2013.01); *A47K 13/22* (2013.01)

(58) Field of Classification Search
CPC .............................. B31D 1/0037; A47K 13/22
See application file for complete search history.

(56) References Cited

U.S. PATENT DOCUMENTS 1,744,300 A * 1/1930 Dewaide ................ A47K 13/16 D23/311
1,773,591 A * 8/1930 McCorkindale ..... B31D 1/0037 493/342

(Continued)

FOREIGN PATENT DOCUMENTS

DE 3612070 A * 10/1987 ........... B31D 1/0037
EP 0317971 A2 * 5/1989

(Continued)

*Primary Examiner* — Lucas E. A. Palmer
(74) *Attorney, Agent, or Firm* — Ming Jiang; MM IP SERVICES LLC

(57) ABSTRACT

The present disclosure relates to methods of using a machine for manufacturing continuous toilet seat cover reels. Methods include: loading a continuous paper roll onto a shaft in a first end of the machine; threading continuous paper on continuous paper roll through a continuous paper reel transmission mechanism, a printing wheel, a modular cutting mechanism, a counting wheel of the machine, onto a reel at a continuous toilet seat cover reel output device in a second end; perforating continuous paper roll to form sheet perforated tear lines, a splash prevention perforated tear line, one or more vertical splash prevention perforated tear lines and horizontal splash prevention perforated tear lines; counting the number of toilet seat cover sheets generated on the continuous toilet seat cover; and cutting the last sheet of toilet seat cover sheet from the continuous toilet seat cover to produce the continuous toilet seat cover reel.

13 Claims, 6 Drawing Sheets

(56) References Cited

U.S. PATENT DOCUMENTS

| | | | | | |
|---|---|---|---|---|---|
| 2,280,092 | A * | 4/1942 | Kirch | B31D 1/0037 | 493/369 |
| 3,852,140 | A * | 12/1974 | Jenkins | B31D 1/021 | 156/268 |
| 4,261,066 | A * | 4/1981 | Belz | A47K 13/18 | 428/401 |
| 4,369,906 | A * | 1/1983 | Isherwood | B65H 23/1888 | 226/42 |
| 4,469,728 | A * | 9/1984 | Belz | A47K 13/18 | 428/36.1 |
| 4,627,117 | A * | 12/1986 | Morishita | A47K 13/18 | 206/390 |
| 4,856,694 | A * | 8/1989 | Shih | A47K 13/225 | 226/134 |
| 4,887,321 | A * | 12/1989 | MacLean | A47K 13/18 | 4/244.2 |
| 4,920,584 | A * | 5/1990 | Abdrabbo | A47K 13/16 | 4/245.7 |
| 5,098,367 | A * | 3/1992 | Bullinger | B65H 45/28 | 493/359 |
| 5,171,203 | A * | 12/1992 | Bullinger | B31D 1/0037 | 493/359 |
| 6,484,328 | B1 * | 11/2002 | Frazier | A47K 13/165 | 4/245.3 |
| 7,254,845 | B1 * | 8/2007 | Morad | A47K 13/16 | 4/245.3 |
| 2006/0233995 | A1 * | 10/2006 | Garland | G09F 3/10 | 156/267 |
| 2007/0209099 | A1 * | 9/2007 | Issachar | A47K 13/22 | 4/245.1 |
| 2009/0249748 | A1 * | 10/2009 | Byers, II | A47K 13/14 | 53/428 |
| 2010/0075094 | A1 * | 3/2010 | Cattacin | B26F 1/20 | 83/37 |
| 2016/0000280 | A1 * | 1/2016 | Mardukhayev | A47K 13/18 | 4/245.5 |
| 2019/0014959 | A1 * | 1/2019 | Mardukhayev | A47K 13/16 | |
| 2019/0059663 | A1 * | 2/2019 | Beadles | A47K 13/16 | |
| 2020/0331224 | A1 * | 10/2020 | Han | A47K 13/22 | |

FOREIGN PATENT DOCUMENTS

| | | | |
|---|---|---|---|
| GB | 339109 | A * | 12/1930 |
| KE | 101345607 | B1 * | 1/2014 |
| KR | 20080113186 | A * | 12/2008 |

* cited by examiner

METHODS OF USING A MACHINE FOR MANUFACTURING CONTINUOUS TOILET SEAT COVER REELS

FIELD

The present disclosure generally relates to the field of bathroom supply, and more particularly to a continuous toilet seat cover reel, a machine for manufacturing the continuous toilet seat cover reels, and methods of using the machine to manufacture the continuous toilet seat cover reels.

BACKGROUND

In order to prevent certain transmitted diseases, some sanitary toilets in public bathrooms are provided with toilet seat cover sheets. Currently, single pull-up toilet seat cover sheet or folded toilet seat cover sheets are widely used in toilets in public bathrooms. For the single pull-up toilet seat cover sheet, a user has to take the toilet sear cover sheet from a package, unfold the folded toilet sear cover sheet, and put on the toilet seat. For the folded toilet seat cover sheets, the user still has to take the folded toilet seat cover sheets out of a container, unfold the folded toilet sear cover sheet, and put on the toilet seat. It is not convenient to use either one of the toilet seat cover sheets.

It is desirable for the user to retrieve a flat toilet seat cover sheet and directly put over the toilet seat. Such flat toilet seat cover sheets may be provided through a continuous seat cover sheet reel. Currently, there is no machine that can manufacture the continuous seat cover sheet reels.

Therefore, an unaddressed need exists in the art to address the aforementioned deficiencies and inadequacies.

SUMMARY

In one aspect, the present disclosure relates to a continuous toilet seat cover reel. In certain embodiments, the continuous toilet seat cover reel includes a predetermined number of toilet seat cover sheets. These toilet seat cover sheets are perforated and rolled in the continuous toilet seat cover reel. Each toilet seat cover sheet includes: a seat cover portion, and a splash prevention portion. The splash prevention portion also includes a splash prevention tongue, and a top end of the splash prevention tongue. The seat cover portion and the splash prevention portion are perforated by a splash prevention perforated tear line into a toilet bowl shape to allow a user to separate the seat cover portion from the splash prevention portion for use on a toilet.

In certain embodiments, each toilet seat cover sheet has a predetermined length L.

In certain embodiments, the continuous toilet seat cover reel includes sheet perforated tear lines between two adjacent toilet seat cover sheets to allow the user to separate a toilet seat cover sheet from the continuous toilet seat cover reel, and sheet separation marking lines printed between two adjacent toilet seat cover sheets to indicate where the toilet seat cover sheet is to be separated from the continuous toilet seat cover reel.

In certain embodiments, the top end of the splash prevention tongue includes one or more vertical splash prevention perforated tear lines and horizontal splash prevention perforated tear lines for the user to separate the splash prevention portion from the seat cover portion.

In certain embodiments, each of the sheet perforated tear lines, the splash prevention perforated tear line, the vertical splash prevention perforated tear lines and the horizontal splash prevention perforated tear lines includes a predetermined number of attached segments and a predetermined number of detached segments for easy separation.

In certain embodiments, each toilet seat cover sheet may also include a counting indicator. In one embodiment, the counting indicator is an opto-electrical counting hole punctured in a predetermined location of the toilet seat cover sheet. In another embodiment, the counting indicator is a counting marking printed in a predetermined location of the toilet seat cover sheet.

In another aspect, the present disclosure relates to a machine for manufacturing continuous toilet seat cover reels. In certain embodiments, the machine for manufacturing continuous toilet seat cover reels includes: a continuous paper reel transmission mechanism, a modular cutting mechanism, and a counting wheel. The continuous paper reel transmission mechanism receives continuous paper from a continuous paper reel on a continuous paper reel rotating shaft. The modular cutting mechanism includes a modular cutting wheel. The modular cutting mechanism receives continuous paper reel from the continuous paper reel transmission mechanism and perforates the continuous paper reel using the modular cutting wheel to generate a continuous toilet seat cover. The counting wheel counts the number of toilet seat cover sheets on the continuous toilet seat cover generated by the modular cutting wheel.

In certain embodiments, the continuous paper reel transmission mechanism supplies the continuous paper reel to the modular cutting mechanism to form toilet seat cover sheets on the continuous toilet seat cover, while the counting wheel counts the number of toilet seat cover sheets on the continuous toilet seat cover generated by the modular cutting wheel. When the number of toilet seat cover sheets on the continuous toilet seat cover reaches a predetermined number of toilet seat cover sheets per each continuous toilet seat cover reel, the machine produces one continuous toilet seat cover reel.

In certain embodiments, the continuous toilet seat cover reel includes a predetermined number of toilet seat cover sheets. These toilet seat cover sheets are perforated and rolled in the continuous toilet seat cover reel. Each toilet seat cover sheet includes: a seat cover portion, and a splash prevention portion. The splash prevention portion also includes a splash prevention tongue, and a top end of the splash prevention tongue. The seat cover portion and the splash prevention portion are perforated by a splash prevention perforated tear line into a toilet bowl shape to allow a user to separate the seat cover portion from the splash prevention portion for use on a toilet.

In certain embodiments, each toilet seat cover sheet has a predetermined length L.

In certain embodiments, the continuous toilet seat cover reel includes sheet perforated tear lines between two adjacent toilet seat cover sheets to allow the user to separate a toilet seat cover sheet from the continuous toilet seat cover reel, and sheet separation marking lines printed between two adjacent toilet seat cover sheets to indicate where the toilet seat cover sheet is to be separated from the continuous toilet seat cover reel.

In certain embodiments, the top end of the splash prevention tongue includes one or more vertical splash prevention perforated tear lines and horizontal splash prevention perforated tear lines for the user to separate the splash prevention portion from the seat cover portion.

In certain embodiments, each of the sheet perforated tear lines, the splash prevention perforated tear line, the vertical splash prevention perforated tear lines and the horizontal splash prevention perforated tear lines includes a predetermined number of attached segments and a predetermined number of detached segments for easy separation.

In certain embodiments, the modular cutting wheel perforates the sheet perforated tear lines between two adjacent toilet seat cover sheets, the splash prevention perforated tear line, the vertical splash prevention perforated tear lines and the horizontal splash prevention perforated tear lines between the seat cover portion and the splash prevention portion.

In certain embodiments, each toilet seat cover sheet may also include a counting indicator. In one embodiment, the counting indicator is an opto-electrical counting hole punctured in a predetermined location of the toilet seat cover sheet. In another embodiment, the counting indicator is a counting marking printed in a predetermined location of the toilet seat cover sheet.

In one embodiment, the modular cutting mechanism includes an opto-electrical counting hole punching device to puncture the opto-electrical counting hole in the predetermined location of the toilet seat cover sheet. In another embodiment, the modular cutting mechanism includes a counting marking printing device to print the counting marking in the predetermined location of the toilet seat cover sheet.

In certain embodiments, the machine includes a printing wheel to print the sheet separation marking lines between two adjacent toilet seat cover sheets.

In certain embodiments, the machine includes a pressing wheel to press the continuous paper reel against the modular cutting wheel to generate the continuous toilet seat cover.

In certain embodiments, the machine includes a continuous toilet seat cover reel output device. When the number of toilet seat cover sheets on the continuous toilet seat cover generated reaches the predetermined number of toilet seat cover sheets per each continuous toilet seat cover reel, the continuous toilet seat cover reel output device cuts the last sheet of toilet seat cover sheet from the continuous toilet seat cover to produce the continuous toilet seat cover reel.

In yet another aspect, the present disclosure relates to a method of manufacturing continuous toilet seat cover reel. In certain embodiments, the method includes: loading, by a manufacturing staff, a continuous paper roll onto a continuous paper reel rotating shaft in a first end of a machine for manufacturing continuous toilet seat cover reels, threading the continuous paper of the continuous paper roll through a continuous paper reel transmission mechanism, a printing wheel, a modular cutting mechanism, and a counting wheel of the machine onto a reel at a continuous toilet seat cover reel output device in a second end, perforating, by a modular cutting wheel of the modular cutting mechanism, the continuous paper roll to form sheet perforated tear lines between two adjacent toilet seat cover sheets, a splash prevention perforated tear line between a seat cover portion and a splash prevention portion of the toilet seat cover sheets, one or more vertical splash prevention perforated tear lines and horizontal splash prevention perforated tear lines between the seat cover portion and the splash prevention portion of the toilet seat cover sheet to generate a continuous toilet seat cover, counting, by a counting wheel, the number of toilet seat cover sheets generated on the continuous toilet seat cover by the modular cutting wheel, and cutting, by the continuous toilet seat cover reel output device, the last sheet of toilet seat cover sheet from the continuous toilet seat cover to produce the continuous toilet seat cover reel.

In certain embodiments, the method may also include: removing, by the continuous toilet seat cover reel output device, the continuous toilet seat cover reel produced at the continuous toilet seat cover reel output device, and replacing the continuous paper roll when the continuous paper roll runs out.

These and other aspects of the present disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment. The drawings do not limit the present disclosure to the specific embodiments disclosed and described herein. The drawings are not necessarily to scale, emphasis instead being placed upon clearly illustrating the principles of the disclosure, and wherein.

DETAILED DESCRIPTION

Figure 1:
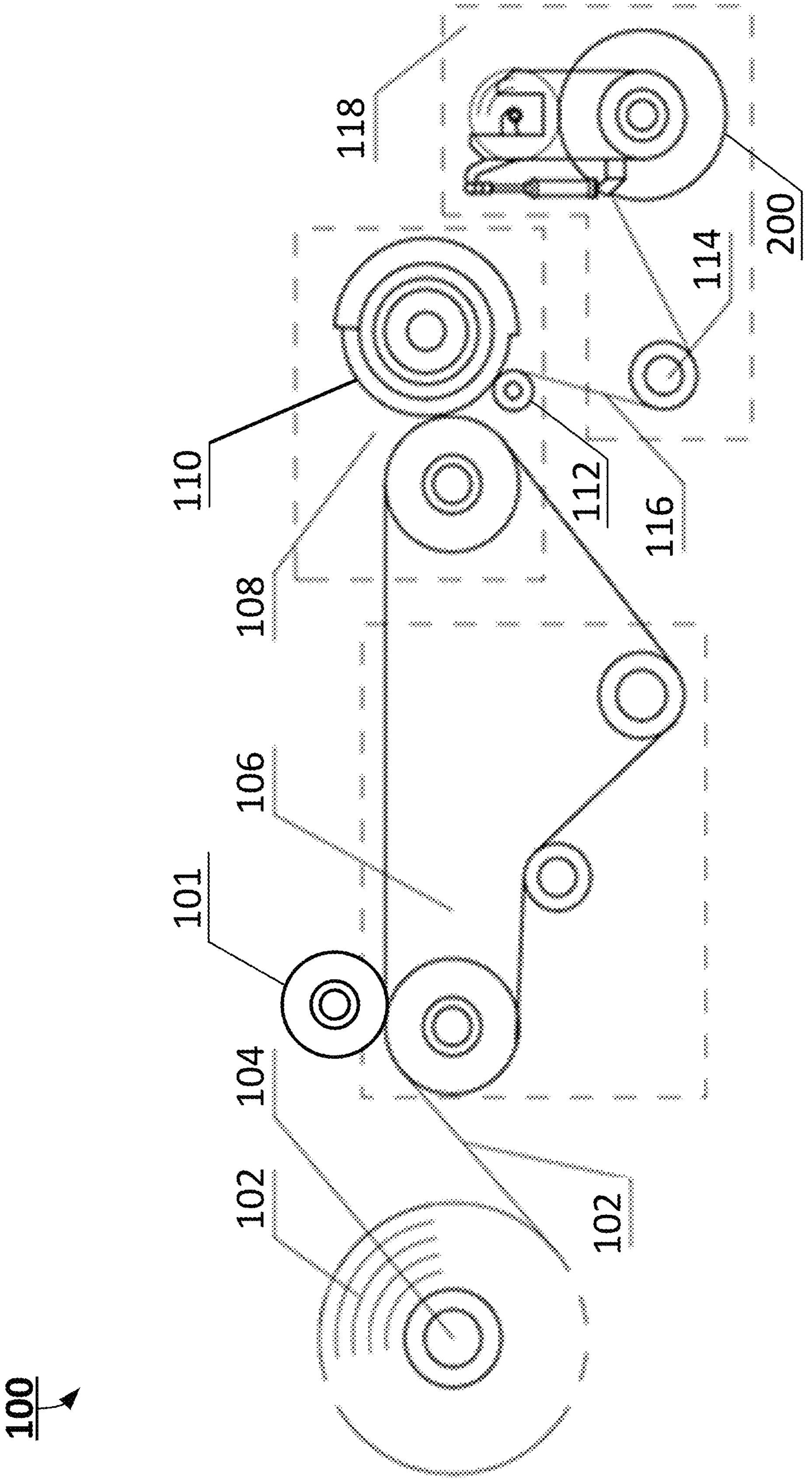
FIG. 1 illustrates a machine for manufacturing continuous toilet seat cover reels according to certain embodiments of the present disclosure.

The present disclosure will now be described more fully hereinafter with reference to the accompanying drawings, in which exemplary embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top," and "front" or "back" may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximates, meaning that the term "around", "about" or "approximately" can be inferred if not expressly stated.

Many specific details are provided in the following descriptions to make the present disclosure be fully understood, but the present disclosure may also be implemented by using other manners different from those described herein, so that the present disclosure is not limited by the specific embodiments disclosed in the following.

The description will be made as to the embodiments of the present disclosure in conjunction with the accompanying drawings FIGS. 1 through 6.

In one aspect, as shown in FIGS. 2-5, the present disclosure relates to a continuous toilet seat cover reel 200. In certain embodiments, the continuous toilet seat cover reel 200 includes a predetermined number of toilet seat cover sheets 201. These toilet seat cover sheets 201 are perforated and rolled in the continuous toilet seat cover reel 200. Each toilet seat cover sheet 201 includes: a seat cover portion 202, and a splash prevention portion 204. The splash prevention portion 204 also includes a splash prevention tongue 206, and a top end of the splash prevention tongue 208. The seat cover portion 202 and the splash prevention portion 204 are perforated by a splash prevention perforated tear line 214 into a toilet bowl shape to allow a user to separate the seat cover portion 202 from the splash prevention portion 204 for use on a toilet. In one embodiment, the splash prevention portion 204 is perforated in a rounded toilet bowl shape, not showing in FIGS. 2-5. In another embodiment, the splash prevention portion 204 is perforated in an elongated toilet bowl shape, as shown in FIGS. 2-5.

Figure 2:
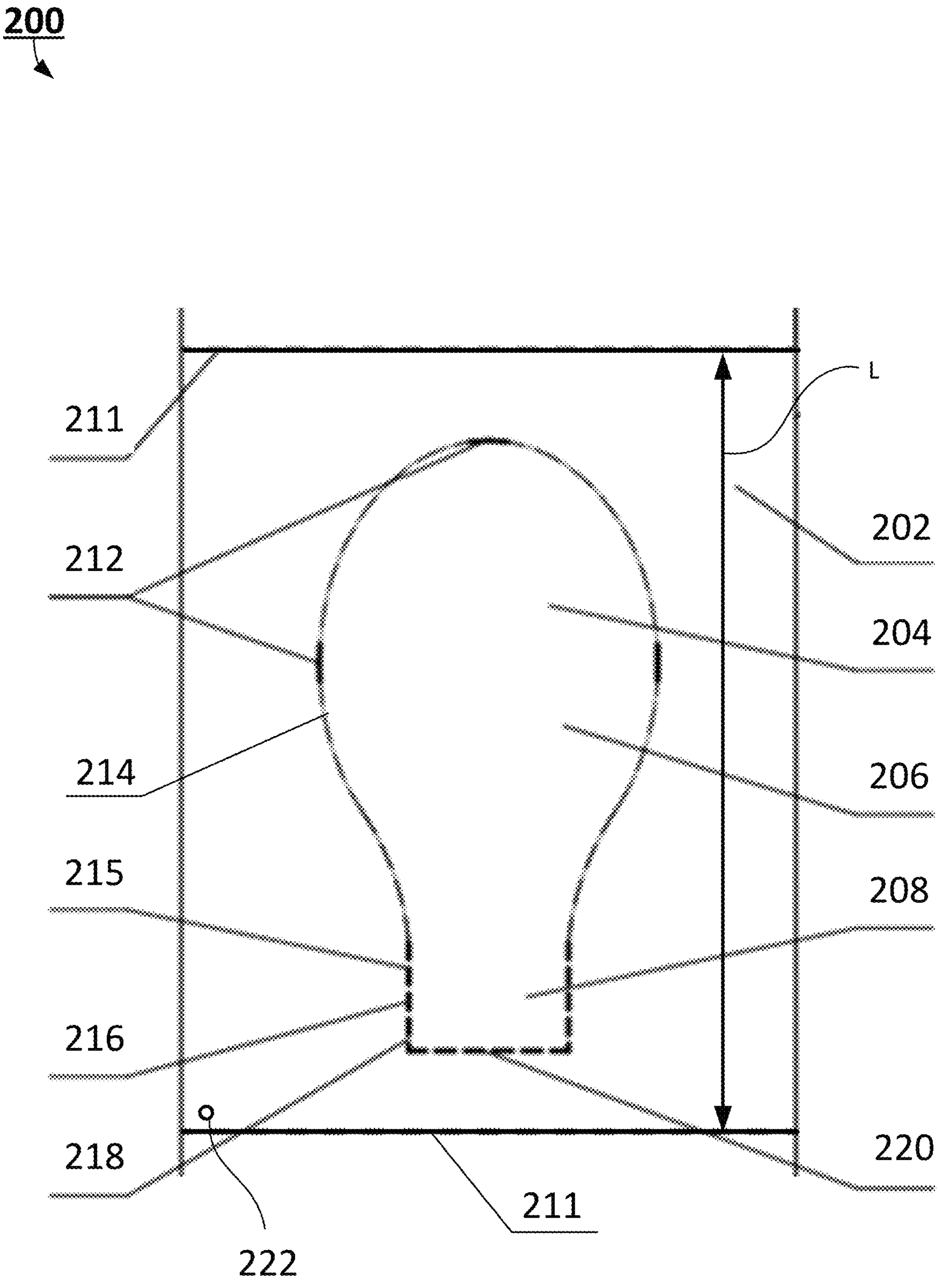
FIG. 2 illustrates an individual toilet seat cover sheet on a continuous toilet seat cover reel for the automatic toilet seat cover dispenser according to one embodiment of the present disclosure.
Figure 3:
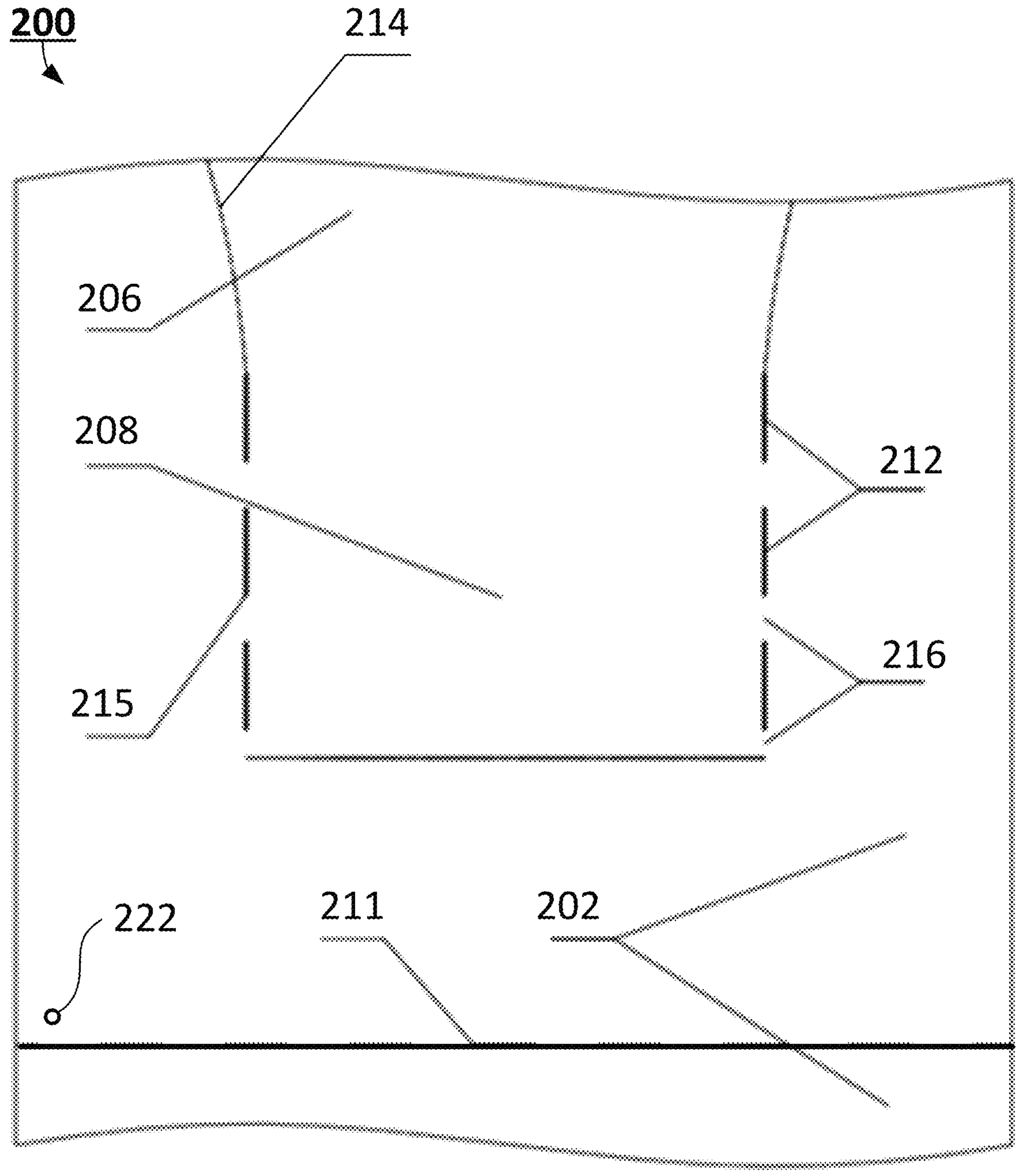
FIG. 3 is an enlarged portion of the toilet seat cover sheet on the continuous toilet seat cover reel showing detailed construction of the toilet seat cover sheet according to one embodiment of the present disclosure.
Figure 4:
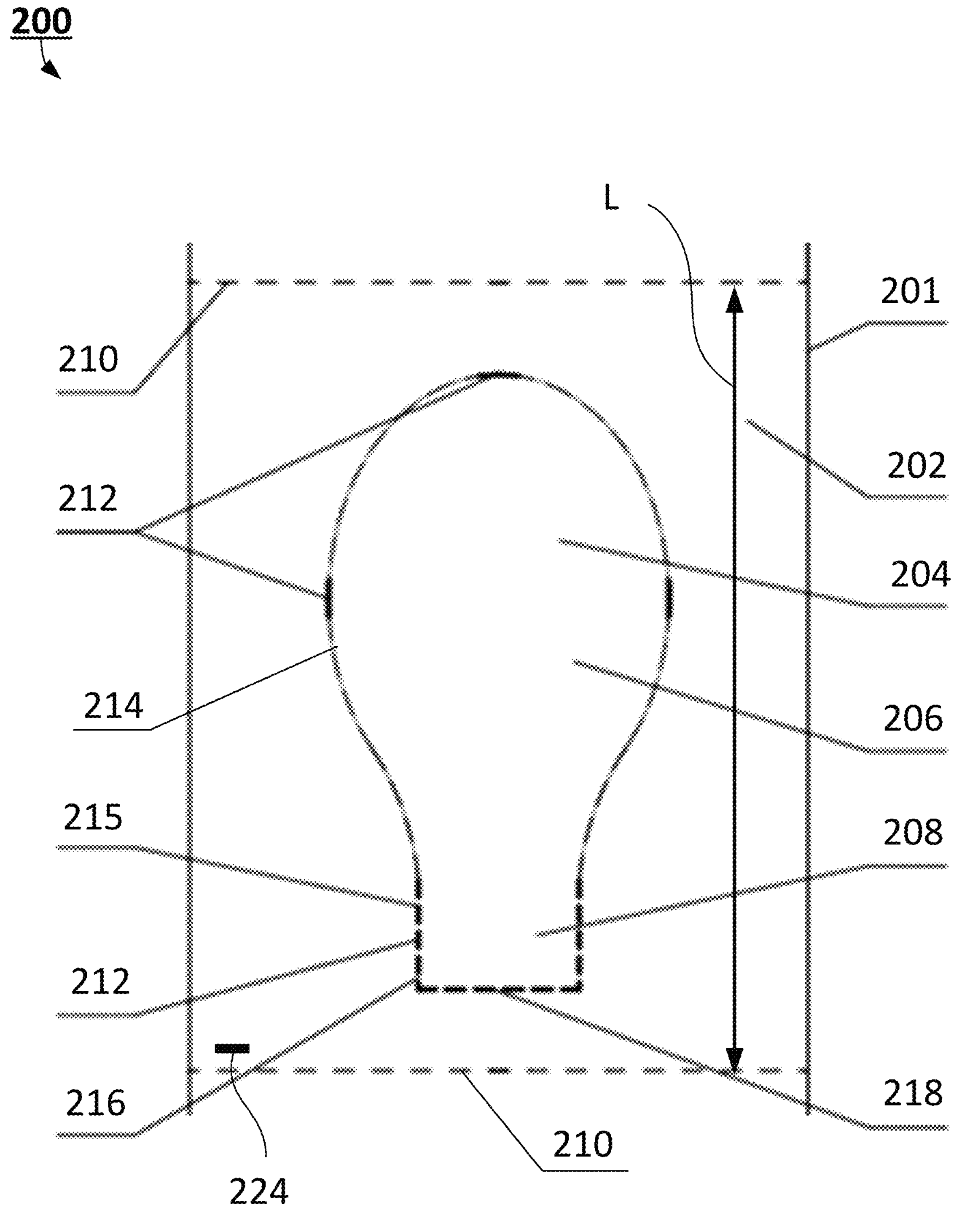
FIG. 4 illustrates another individual toilet seat cover sheet on the continuous toilet seat cover reel according to another embodiment of the present disclosure.
Figure 5:
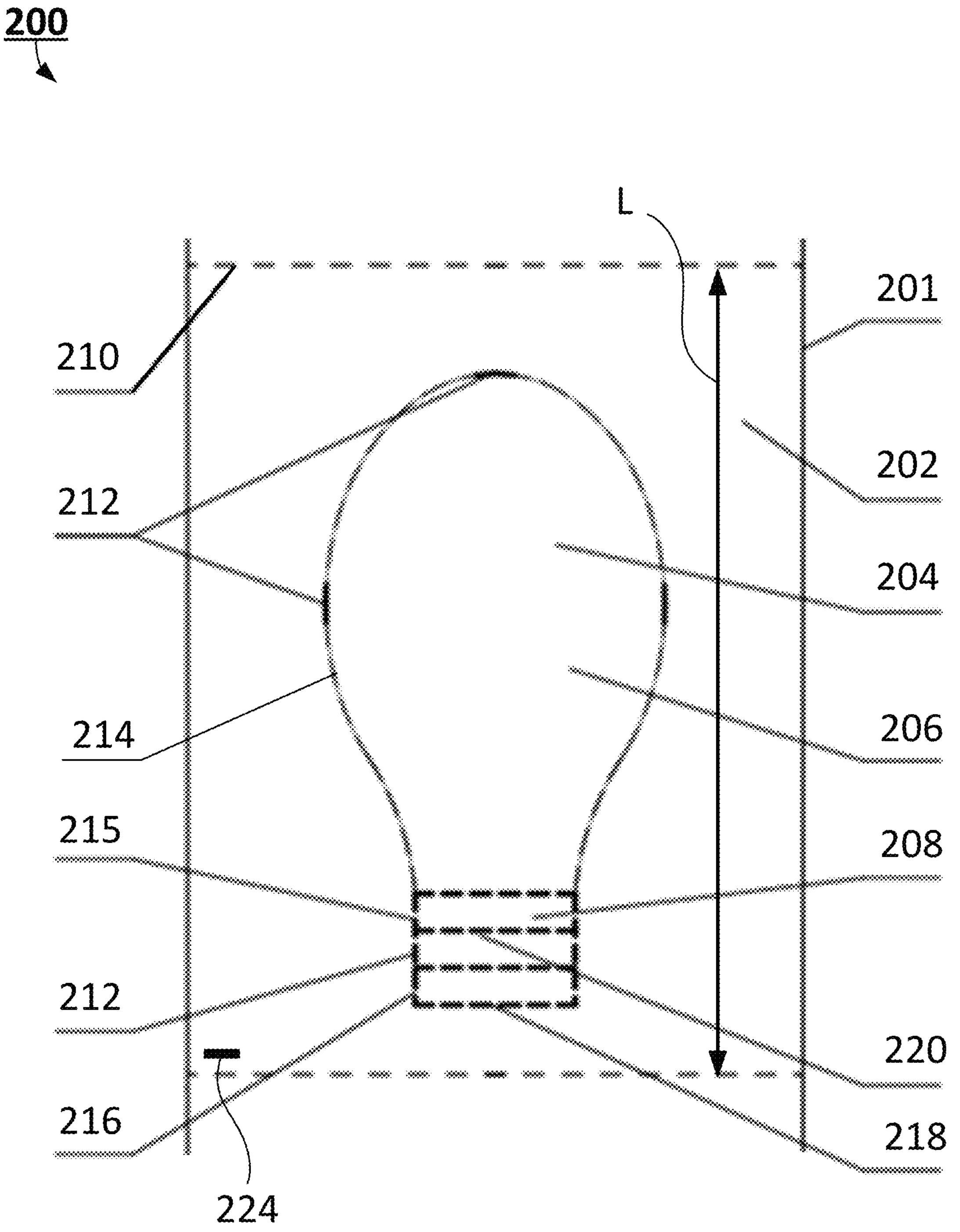
FIG. 5 illustrates yet another individual toilet seat cover sheet on the continuous toilet seat cover reel according to an additional embodiment of the present disclosure.

In certain embodiments, each toilet seat cover sheet 201 has a predetermined length, as marked L in FIGS. 2, 4, and 5. In one embodiment, the toilet seat cover sheet 201 (L) is approximately 14 inches (35 CM) to fit the rounded toilet bowl shape. In another embodiment, the toilet seat cover sheet 201 (L) is approximately 18 inches (45 CM) to fit the elongated toilet bowl shape, as shown in FIGS. 2-5.

In one embodiment, as shown in FIGS. 4 and 5, the continuous toilet seat cover reel 200 includes sheet perforated tear lines 210 between two adjacent toilet seat cover sheets 201 to allow the user to separate a toilet seat cover sheet 201 from the continuous toilet seat cover reel 200. In another embodiment, as shown in FIGS. 2 and 3, the continuous toilet seat cover reel 200 includes sheet separation marking lines 211 printed between two adjacent toilet seat cover sheets 201 to indicate where the toilet seat cover sheet 201 is to be separated from the continuous toilet seat cover reel 200.

In certain embodiments, the top end of the splash prevention tongue 208 includes one or more vertical splash prevention perforated tear lines 215 and horizontal splash prevention perforated tear lines 220 and 218 for the user to separate the splash prevention portion 204 from the seat cover portion 202. In one embodiment, the splash prevention portion 204 may be used with the splash prevention portion 204 attached to the seat cover portion 202. In another embodiment, the splash prevention portion 204 may be used with the splash prevention portion 204 detached from the seat cover portion 202, and the detached splash prevention portion 204 is placed in a toilet bowl.

In certain embodiments, each of the sheet perforated tear lines 210, the splash prevention perforated tear line 214, the vertical splash prevention perforated tear lines 215 and the horizontal splash prevention perforated tear lines 218 and 220 includes a predetermined number of attached segments 212 and a predetermined number of detached segments 216 for easy separation.

In certain embodiments, each toilet seat cover sheet 201 may also include a counting indicator. In one embodiment, the counting indicator is an opto-electrical counting hole 222 punctured in a predetermined location of each toilet seat cover sheet 201, as shown in FIGS. 2 and 3. In another embodiment, the counting indicator is a counting marking 224 printed in a predetermined location of each toilet seat cover sheet 201, as shown in FIGS. 4 and 5.

In another aspect, as shown in FIG. 1, the present disclosure relates to a machine 100 for manufacturing continuous toilet seat cover reels 200. In certain embodiments, the machine 100 for manufacturing continuous toilet seat cover reels 200 includes: a continuous paper reel transmission mechanism 106, a modular cutting mechanism 108, and a counting wheel 114. The continuous paper reel transmission mechanism 106 receives continuous paper from a continuous paper reel 102 on a continuous paper reel rotating shaft 104. The modular cutting mechanism 108 includes a modular cutting wheel 110. The modular cutting mechanism 108 receives continuous paper reel 102 from the continuous paper reel transmission mechanism 106 and perforates the continuous paper reel 102 using the modular cutting wheel 110 to generate a continuous toilet seat cover 116 having multiple toilet seat cover sheets 201. The counting wheel 114 counts the number of toilet seat cover sheets 201 on the continuous toilet seat cover 116 generated by the modular cutting wheel 110.

In certain embodiments, the continuous paper reel transmission mechanism 106 supplies the continuous paper reel 102 to the modular cutting mechanism 108 to form multiple toilet seat cover sheets 201 on the continuous toilet seat cover 116, while the counting wheel 114 counts the number of toilet seat cover sheets 201 on the continuous toilet seat cover 116 generated by the modular cutting wheel 110.

In certain embodiments, each toilet seat cover sheet 201 has a predetermined length, as marked L in FIGS. 2, 4, and 5. In one embodiment, the toilet seat cover sheet 201 (L) is approximately 14 inches (35 CM) to fit the rounded toilet bowl shape. In another embodiment, the toilet seat cover sheet 201 (L) is approximately 18 inches (45 CM) to fit the elongated toilet bowl shape, as shown in FIGS. 2-5.

In certain embodiments, the circumference of the modular cutting wheel 110 equals the length L of each toilet seat cover sheet 201. In one embodiment, for the rounded toilet bowl shape, the circumference of the modular cutting wheel 110 is designed to be 14 inches to allow the modular cutting wheel 110 to perforate one toilet seat cover sheet 201 per rotation. In another embodiment, for the elongated toilet bowl shape, the circumference of the modular cutting wheel 110 is designed to be 18 inches to allow the modular cutting wheel 110 to perforate one toilet seat cover sheet 201 per rotation.

In certain embodiments, the continuous toilet seat cover reel 200 includes a predetermined number of toilet seat cover sheets 201, for example, 200 or 500 per continuous toilet seat cover reel 200. When the number of toilet seat cover sheets 201 on the continuous toilet seat cover 116 generated reaches the predetermined number of toilet seat cover sheets 201 per each continuous toilet seat cover reel 200 the machine 100 produces one continuous toilet seat cover reel 200.

These toilet seat cover sheets 201 are perforated and rolled in the continuous toilet seat cover reel 200. Each toilet seat cover sheet 201 includes: a seat cover portion 202, and a splash prevention portion 204. The splash prevention portion 204 also includes a splash prevention tongue 206, and a top end of the splash prevention tongue 208. The seat cover portion 202 and the splash prevention portion 204 are perforated by a splash prevention perforated tear line 214 into a toilet bowl shape to allow a user to separate the seat cover portion 202 from the splash prevention portion 204 for use on a toilet. In one embodiment, the splash prevention portion 204 is perforated in a rounded toilet bowl shape, not showing in FIGS. 2-5. In another embodiment, the splash prevention portion 204 is perforated in an elongated toilet bowl shape, as shown in FIGS. 2-5.

In one embodiment, as shown in FIGS. 4 and 5, the continuous toilet seat cover reel 200 includes a sheet perforated tear line 210 between two adjacent toilet seat cover sheets 201 to allow the user to separate a toilet seat cover sheet 201 from the continuous toilet seat cover reel 200. In another embodiment, as shown in FIGS. 2 and 3, the continuous toilet seat cover reel 200 includes a sheet separation marking line 211 printed between two adjacent toilet seat cover sheets 201 to indicate where the toilet seat cover sheet 201 is to be separated from the continuous toilet seat cover reel 200.

In certain embodiments, the top end of the splash prevention tongue 208 includes one or more vertical splash prevention perforated tear lines 215 and horizontal splash prevention perforated tear lines 220 and 218 for the user to separate the splash prevention portion 204 from the seat cover portion 202. In one embodiment, the splash prevention portion 204 may be used with the splash prevention portion 204 attached to the seat cover portion 202. In another embodiment, the splash prevention portion 204 may be used with the splash prevention portion 204 detached from the seat cover portion 202, and the detached splash prevention portion 204 is placed in a toilet bowl.

In certain embodiments, each of the sheet perforated tear lines 210, the splash prevention perforated tear line 214, the vertical splash prevention perforated tear lines 215 and the horizontal splash prevention perforated tear lines 218 and 220 includes a predetermined number of attached segments 212 and a predetermined number of detached segments 216 for easy separation.

In certain embodiments, the outside surface of the modular cutting wheel 110 includes various blades to perforate the sheet perforated tear lines 210, the splash prevention perforated tear line 214, the vertical splash prevention perforated tear lines 215 and the horizontal splash prevention perforated tear lines 218 and 220 and generate a toilet seat cover sheet 201 per rotation.

In certain embodiments, the machine 100 includes a printing wheel 101 to print the sheet separation marking lines 211 between two adjacent toilet seat cover sheets 201.

In certain embodiments, the machine 100 includes a pressing wheel 112 to press the continuous paper reel 102 against the modular cutting wheel 110 to generate the continuous toilet seat cover 116.

In certain embodiments, each toilet seat cover sheet 201 may also include a counting indicator. In one embodiment, the counting indicator is an opto-electrical counting hole 222 punctured in a predetermined location of each toilet seat cover sheet 201, as shown in FIGS. 2 and 3. In another embodiment, the counting indicator is a counting marking 224 printed in a predetermined location of each toilet seat cover sheet 201, as shown in FIGS. 4 and 5.

In one embodiment, the modular cutting mechanism 108 includes an opto-electrical counting hole punching device to puncture the opto-electrical counting hole 222 in the predetermined location of the toilet seat cover sheets 201. In another embodiment, the modular cutting mechanism 108 includes a counting marking printing device to print the counting marking 224 in the predetermined location of the toilet seat cover sheets 201.

In certain embodiments, as shown in FIG. 1, the machine 100 includes a printing wheel 101 to print the sheet separation marking lines 211 between two adjacent toilet seat cover sheets 201.

In certain embodiments, as shown in FIG. 1, the machine 100 includes a pressing wheel 112 to press the continuous paper reel 102 against the modular cutting wheel 110 to generate the continuous toilet seat cover 116.

In certain embodiments, as shown in FIG. 1, the machine 100 includes a continuous toilet seat cover reel output device 118. When the number of toilet seat cover sheets 201 on the continuous toilet seat cover 116 generated reaches the predetermined number of toilet seat cover sheets 201 per each continuous toilet seat cover reel 200, the continuous toilet seat cover reel output device 118 cuts the last sheet of toilet seat cover sheet 201 from the continuous toilet seat cover 116 to produce the continuous toilet seat cover reel 200.

Figure 6:
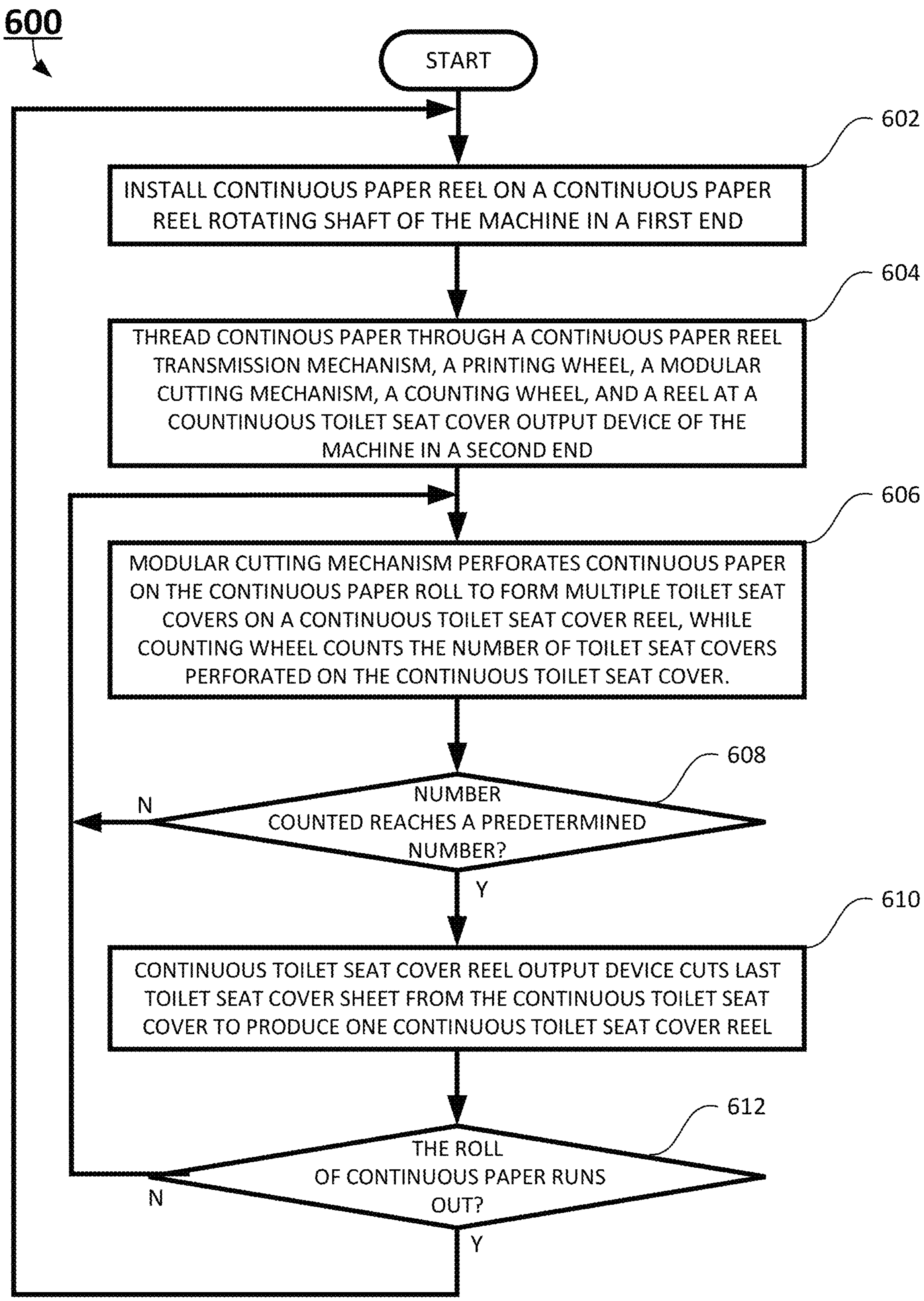
FIG. 6 a flow chart of an exemplary method of manufacturing continuous toilet seat cover reels using the machine according to certain embodiments of the present disclosure.

In yet another aspect, as shown in FIG. 6, the present disclosure relates to a method of manufacturing continuous toilet seat cover reel 200. In certain embodiments, the method includes: loading, by a manufacturing staff, a continuous paper roll 102 onto a continuous paper reel rotating shaft 104 in a first end of a machine 100 for manufacturing continuous toilet seat cover reels 200, threading the continuous paper of the continuous paper roll 102 through a continuous paper reel transmission mechanism 106, a printing wheel 101, a modular cutting mechanism 108, and a counting wheel 114 of the machine 100 onto a reel at a continuous toilet seat cover reel output device 118 in a second end.

In certain embodiments, when the machine 100 is turned on and running, the method includes: perforating, by a modular cutting wheel 110 of the modular cutting mechanism 108, the continuous paper roll 102 to form sheet perforated tear lines 210 between two adjacent toilet seat cover sheets 201, a splash prevention perforated tear line 214 between a seat cover portion 202 and a splash prevention portion 204 of the toilet seat cover sheets 201, one or more vertical splash prevention perforated tear lines 215 and horizontal splash prevention perforated tear lines 218 and 220 between the seat cover portion 202 and the splash prevention portion 204 of the toilet seat cover sheet 201 to generate a continuous toilet seat cover 116, and counting, by a counting wheel 114, the number of toilet seat cover sheets 201 generated on the continuous toilet seat cover 116 by the modular cutting wheel 110.

In certain embodiments, when the number of toilet seat cover sheets 201 generated by the modular cutting mechanism 108 reaches a predetermined number of toilet seat cover sheets 201 per each continuous toilet seat cover reels on the continuous toilet seat cover 116, the method further includes: cutting, by the continuous toilet seat cover reel output device 118, the last sheet of toilet seat cover sheet 201 from the continuous toilet seat cover 116 to produce the continuous toilet seat cover reel 200.

In certain embodiments, the method may also include: removing, by the continuous toilet seat cover reel output device 118, the continuous toilet seat cover reel 200 produced at the continuous toilet seat cover reel output device 118, and replacing the continuous paper roll 102 when the continuous paper roll 102 runs out.

In certain embodiments, FIG. 6 shows a flow chart of an exemplary method 600 of manufacturing continuous toilet seat cover reels using the machine 100 according to certain embodiments of the present disclosure.

At block 602, a manufacturing staff loads a continuous paper roll 102 onto a continuous paper reel rotating shaft 104 in a first end of a machine 100 for manufacturing continuous toilet seat cover reels 200.

At block 604, the continuous paper of the continuous paper roll 102 is threaded through a continuous paper reel transmission mechanism 106, a printing wheel 101, a modular cutting mechanism 108, and a counting wheel 114 of the machine 100 onto a reel at a continuous toilet seat cover reel output device 118 in a second end.

At block 606, in certain embodiments, when the machine 100 is turned on and running, a modular cutting wheel 110 of the modular cutting mechanism 108 perforates the continuous paper roll 102 to form a toilet seat cover sheet 201 per rotation of the modular cutting wheel 110. The modular cutting wheel 110 perforates sheet perforated tear lines 210 between two adjacent toilet seat cover sheets 201, a splash prevention perforated tear line 214 between a seat cover portion 202 and a splash prevention portion 204 of the toilet seat cover sheets 201, one or more vertical splash prevention perforated tear lines 215 and horizontal splash prevention perforated tear lines 218 and 220 between the seat cover portion 202 and the splash prevention portion 204 of the toilet seat cover sheet 201 and generates multiple toilet seat cover sheets 201 on a continuous toilet seat cover 116. A counting wheel 114 counts the number of toilet seat cover sheets 201 generated on the continuous toilet seat cover 116 by the modular cutting wheel 110.

At query block 608, when the number of toilet seat cover sheets 201 generated by the modular cutting mechanism 108 reaches a predetermined number of toilet seat cover sheets 201 per each continuous toilet seat cover reels on the continuous toilet seat cover 116, the method 600 proceeds to block 610, otherwise, the method 600 proceeds to block 606.

At block 610, when the number of toilet seat cover sheets 201 generated by the modular cutting mechanism 108 reaches a predetermined number of toilet seat cover sheets 201 per each continuous toilet seat cover reels on the continuous toilet seat cover 116, the continuous toilet seat cover reel output device 118 cuts the last sheet of toilet seat cover sheet 201 from the continuous toilet seat cover 116 to produce the continuous toilet seat cover reel 200.

At query block 612, when the roll of continuous paper 102 runs out, the method 600 proceeds to block 602 to reload continuous paper roll 102 on the continuous paper reel rotating shaft, otherwise, the method 600 proceeds to block 606 to continue the production of the toilet seat cover sheets 201 on the continuous toilet seat cover 116.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A method of using a machine for manufacturing continuous toilet seat cover reel, comprising:

loading, by a manufacturing staff, a continuous paper roll onto a continuous paper reel rotating shaft in a first end of a machine for manufacturing continuous toilet seat cover reels;

threading the continuous paper on the continuous paper roll through a continuous paper reel transmission mechanism, a printing wheel, a modular cutting mechanism, a counting wheel of the machine, onto a reel at a continuous toilet seat cover reel output device in a second end;

perforating, by a modular cutting wheel of the modular cutting mechanism, the continuous paper roll to form a sheet perforated tear line between two adjacent toilet seat cover sheets, a splash prevention perforated tear line between a seat cover portion and a splash prevention portion of a toilet seat cover sheet, one or more vertical splash prevention perforated tear lines and horizontal splash prevention perforated tear lines between the seat cover portion and the splash prevention portion of the toilet seat cover sheet on a continuous toilet seat cover;

counting, by the counting wheel, the number of toilet seat cover sheets generated on the continuous toilet seat cover by the modular cutting wheel, wherein each toilet seat cover sheet comprises a counting indicator, and the counting indicator comprises: an opto-electrical counting hole punctured in a predetermined location of the toilet seat cover sheet, and a counting marking printed in a predetermined location of the toilet seat cover sheet; and cutting, by the continuous toilet seat cover reel output device, the last sheet of toilet seat cover sheet from the continuous toilet seat cover to produce the continuous toilet seat cover reel.

2. The method of claim 1 further comprising:

removing, by the continuous toilet seat cover reel output device, the continuous toilet seat cover reel produced at the continuous toilet seat cover reel output device; and replacing the continuous paper roll when the continuous paper roll runs out.

3. The method of claim 1, wherein the continuous toilet seat cover reel comprises:

a plurality of toilet seat cover sheets perforated and arranged in the continuous toilet seat cover reel, wherein each of the plurality of toilet seat cover sheets comprises:

the seat cover portion, and the splash prevention portion, wherein the splash prevention portion comprises a splash prevention tongue, and a top end of the splash prevention tongue, wherein the seat cover portion and the splash prevention portion are perforated by the splash prevention perforated tear line to allow a user to separate the seat cover portion from the splash prevention portion for use on a toilet.

4. The method of claim 3, wherein the modular cutting mechanism comprises:

an opto-electrical counting hole punching device to puncture the opto-electrical counting hole in the predetermined location of the toilet seat cover sheet; and a counting marking printing device to print the counting marking in the predetermined location of the toilet seat cover sheet.

5. The method of claim 3, wherein the machine comprises a printing wheel to print the sheet separation marking line between two adjacent toilet seat cover sheets.

6. The method of claim 3, wherein the machine comprises a pressing wheel to press the continuous paper reel against the modular cutting wheel to generate the continuous toilet seat cover.

7. The method of claim 3 further comprising the continuous toilet seat cover reel output device, wherein when the number of toilet seat cover sheets on the continuous toilet seat cover generated reaches the predetermined number of toilet seat cover sheet per continuous toilet seat cover reel, the continuous toilet seat cover reel output device cuts the last toilet seat cover sheet from the continuous toilet seat cover to produce the continuous toilet seat cover reel.

8. The method of claim 1, wherein the machine for manufacturing continuous toilet seat cover reels comprises:

the continuous paper reel transmission mechanism for receiving continuous paper from a continuous paper reel on the continuous paper reel rotating shaft;

the modular cutting mechanism having the modular cutting wheel for receiving the continuous paper reel from the continuous paper reel transmission mechanism and perforating the continuous paper reel using the modular cutting wheel to generate the continuous toilet seat cover; and the counting wheel for counting the number of toilet seat cover sheets on the continuous toilet seat cover generated by the modular cutting wheel, wherein the continuous paper reel transmission mechanism supplies the continuous paper reel to the modular cutting mechanism to form the plurality of toilet seat cover sheets on the continuous toilet seat cover, while the counting wheel counts the number of toilet seat cover sheets on the continuous toilet seat cover generated by the modular cutting wheel, and when the number of toilet seat cover sheets on the continuous toilet seat cover reaches a predetermined number of toilet seat cover sheets per each continuous toilet seat cover reel, the machine produces one continuous toilet seat cover reel.

9. The method of claim 8, wherein the continuous toilet seat cover reel, comprising:

the plurality of toilet seat cover sheets perforated and rolled in the continuous toilet seat cover reel, wherein each of the plurality of toilet seat cover sheets comprises:

the seat cover portion, and the splash prevention portion, wherein the splash prevention portion comprises a splash prevention tongue, and a top end of the splash prevention tongue, wherein the seat cover portion and the splash prevention portion are perforated by the splash prevention perforated tear line to allow the user to separate the seat cover portion from the splash prevention portion for use on a toilet.

10. The method of claim 9, wherein the continuous toilet seat cover reel comprises:

the sheet perforated tear line between two adjacent toilet seat cover sheets to allow the user to separate the toilet seat cover sheet from the continuous toilet seat cover reel; and a sheet separation marking line printed between two adjacent toilet seat cover sheets to indicate where the toilet seat cover sheet is to be separated from the continuous toilet seat cover reel.

11. The method of claim 10, wherein the top end of the splash prevention tongue comprises the one or more vertical splash prevention perforated tear lines and the horizontal splash prevention perforated tear lines for the user to separate the splash prevention portion from the seat cover portion.

12. The method of claim 11, wherein each of the sheet perforated tear lines, the splash prevention perforated tear line, the vertical splash prevention perforated tear lines and the horizontal splash prevention perforated tear lines comprises a plurality of attached segments and a plurality of detached segments for easy separation.

13. The method of claim 11, wherein the modular cutting wheel perforates the sheet perforated tear line between two adjacent toilet seat cover sheets, the splash prevention perforated tear line, the vertical splash prevention perforated tear lines and the horizontal splash prevention perforated tear lines between the seat cover portion and the splash prevention portion.

* * * * *